United States Patent
Wang et al.

(10) Patent No.: US 10,706,263 B2
(45) Date of Patent: *Jul. 7, 2020

(54) EVALUATION METHOD AND EVALUATION DEVICE FOR FACIAL KEY POINT POSITIONING RESULT

(71) Applicant: Tencent Technology (Shenzhen) Company Limited, Shenzhen, Guangdong (CN)

(72) Inventors: Chengjie Wang, Shenzhen (CN); Jilin Li, Shenzhen (CN); Feiyue Huang, Shenzhen (CN); Kekai Sheng, Shenzhen (CN); Weiming Dong, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/409,341

(22) Filed: May 10, 2019

(65) Prior Publication Data
US 2019/0266385 A1 Aug. 29, 2019

Related U.S. Application Data

(63) Continuation of application No. 15/671,041, filed on Aug. 7, 2017, now Pat. No. 10,331,940, which is a (Continued)

(30) Foreign Application Priority Data

May 20, 2015 (CN) .......................... 2015 1 0259823

(51) Int. Cl.
*G06K 9/00* (2006.01)

(52) U.S. Cl.
CPC ..... *G06K 9/00248* (2013.01); *G06K 9/00281* (2013.01)

(58) Field of Classification Search
CPC .................. G06K 9/00248; G06K 9/00281
See application file for complete search history.

(56) References Cited

U.S. PATENT DOCUMENTS

2008/0304699 A1* 12/2008 Yuasa ................ G06K 9/00281
382/100
2009/0208112 A1 8/2009 Hamamura et al.
(Continued)

FOREIGN PATENT DOCUMENTS

CN 101706872 A 5/2010
CN 101877055 A 11/2010
(Continued)

OTHER PUBLICATIONS

International Search Report for International Application No. PCT/CN2016/079118 dated Jul. 13, 2016 in 2 pages.

*Primary Examiner* — Ping Y Hsieh
(74) *Attorney, Agent, or Firm* — Knobbe, Martens, Olson & Bear, LLP

(57) ABSTRACT

Disclosed are an evaluation method and an evaluation device for a facial key point positioning result. In some embodiments, the evaluation method includes: acquiring a facial image and one or more positioning result coordinates of a key point of the facial image; performing a normalization process on the positioning result coordinate and an average facial model to obtain a normalized facial image; and extracting a facial feature value of the normalized facial image and calculating an evaluation result based on the facial feature value and a weight vector.

17 Claims, 7 Drawing Sheets

Related U.S. Application Data continuation of application No. PCT/CN2016/079118, filed on Apr. 13, 2016.

(56) References Cited

U.S. PATENT DOCUMENTS

| | | | |
|---|---|---|---|
| 2014/0219526 A1* | 8/2014 | Linguraru | G06K 9/00281 382/128 |
| 2014/0270370 A1* | 9/2014 | Saito | G06K 9/00288 382/103 |
| 2015/0055834 A1* | 2/2015 | Zou | G06K 9/00281 382/118 |
| 2015/0302240 A1* | 10/2015 | Rao | G06K 9/00248 382/201 |
| 2016/0196665 A1* | 7/2016 | Abreu | G06T 11/00 345/427 |
| 2016/0253550 A1* | 9/2016 | Zhang | G06K 9/00604 382/203 |
| 2017/0337420 A1 | 11/2017 | Wang et al. | |

FOREIGN PATENT DOCUMENTS

| | | |
|---|---|---|
| CN | 102004899 A | 4/2011 |
| CN | 102486868 A | 6/2012 |
| CN | 104598936 A | 5/2015 |
| CN | 104966046 A | 10/2015 |

* cited by examiner

EVALUATION METHOD AND EVALUATION DEVICE FOR FACIAL KEY POINT POSITIONING RESULT

The present application is a continuation of U.S. application Ser. No. 15/671,041 filed Aug. 7, 2017, which is a continuation of International Patent Application No. PCT/CN2016/079118, filed on Apr. 13, 2016, which claims priority to Chinese Patent Application No. 201510259823.0, titled "EVALUATION METHOD AND EVALUATION DEVICE FOR FACIAL KEY POINT POSITIONING RESULT", filed on May 20, 2015 with the State Intellectual Property Office of the People's Republic of China, each of which are incorporated herein by reference in their entireties.

TECHNICAL FIELD

The present disclosure relates to the field of computer technologies, and in particular to an evaluation method and an evaluation device for a facial key point positioning result.

BACKGROUND

Facial key points are feature points of facial features. A facial key point positioning is to positioning the feature points of the facial features, which is a very important technique in a facial image analysis. A quality of a positioning result of the feature points of the facial features directly affects multiple back-end technologies such as a face beautification and a face recognition. Therefore, it is very important to give an accurate evaluation on the quality of the positioning result of the feature points of the facial features.

In the conventional art, the evaluation on the facial key point positioning result needs to be dependent on human. There are two solutions as follows.

In solution 1, coordinates of points are marked manually in advance. Coordinates of key points of the facial features are marked manually on a facial image, and are stored as a real value. In a case that a positioning algorithm for the key points of the facial features gives result coordinates of the key points, the average distance between the result coordinates and the manually marked coordinates is used for evaluating the quality of the positioning result.

In solution 2, a manual subjective evaluation is performed. The quality of the facial key point positioning result is determined by performing the manual subjective evaluation. By using multiple facial key point positioning algorithm or using randomness of the positioning algorithm, multiple positioning results of facial features are outputted for the same facial image, and then a most accurate result is selected from the multiple positioning results by performing the manual subjective evaluation.

In solution 1, key points of the facial features are marked manually on the facial image. Generally, it takes several minutes to mark coordinates, which is of high labor costs and long time-consuming. This evaluation method is used in a comparison of multiple positioning algorithms for the key points of the facial features.

In solution 2, a manual subjective comparison is performed. By manually comparing the positioning results of the coordinates of the key points, quality of two positioning results is determined based on a subjective judgment. This subjective evaluation has a few requirements for the face, and takes only a few seconds to be completed in a case that the number of results is not many. Although this evaluation method has already been used in some products, but it has obvious disadvantages. Firstly, this evaluation method has stronger subjective and cannot be quantified. Secondly, in a case that the number of results to be compared is large, comparison difficulty is increased and time consumed for manual evaluation increases significantly. Accordingly, the reliability of the evaluation is reduced.

The above two solutions require manual intervention, which is time-consuming and of low efficiency. Furthermore, the positioning results cannot be quantified.

SUMMARY

An evaluation method and an evaluation device for a facial key point positioning result is provided according to embodiments of the present disclosure, in order to provide a technical solution with high efficiency in which the positioning results can be quantified.

An evaluation method for a facial key point positioning result is provided, which includes:

acquiring a facial image and one or more positioning result coordinates of a key point of the facial image;

performing a normalization process on the positioning result coordinate and an average facial model to obtain a normalized facial image; and extracting a facial feature value of the normalized facial image and calculating an evaluation result based on the facial feature value and a weight vector.

An evaluation device for a facial key point positioning result is provided, which includes:

a coordinate positioning unit, configured to acquire a facial image and one or more positioning result coordinates of a key point of the facial image;

a normalization calculating unit, configured to perform a normalization process on the positioning result coordinate and an average facial model to obtain a normalized facial image;

a feature extracting unit, configured to extract a facial feature value of the normalized facial image; and an evaluating unit, configured to calculate an evaluation result based on the facial feature value and a weight vector.

As can be seen from the above technical solutions, after a positioning result coordinate is acquired, a normalization process is implemented by means of an average facial model, and an evaluation result is then calculated based on a facial feature value of a normalized facial image and a weight vector. The whole evaluation process does not need manual intervention, the evaluation speed is high, and parameters used for the calculation of the evaluation result can be quantified, so the evaluation result can be quantified.

BRIEF DESCRIPTION OF THE DRAWINGS

The accompanying drawings used in the description of the embodiments will be described briefly as follows, so that the technical solutions according to the embodiments of the present disclosure will become more apparent. It is apparent that the accompanying drawings in the following description show only some embodiments of the present disclosure. For those skilled in the art, other accompany drawings may be acquired according to these accompany drawings without any creative work.

DETAILED DESCRIPTION OF THE EMBODIMENTS

For a better understanding of the object, technical solutions and advantages of the present disclosure, the present disclosure is further described in detail in conjunction with drawings. It should be understood that the specific embodiments described herein are merely some embodiments of the present disclosure. Other embodiments which may be acquired by those skilled in the art based on these embodiments fall into the protection scope of the present disclosure.

Figure 1:
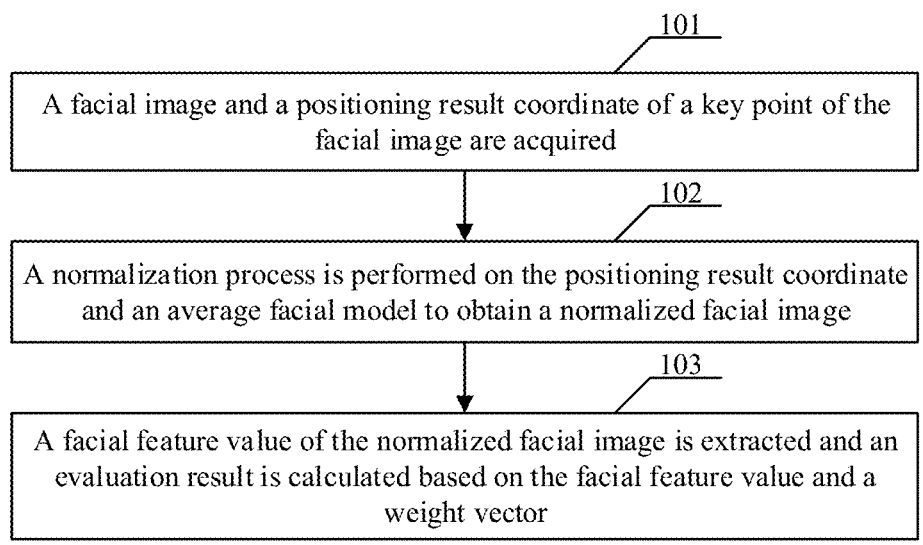
FIG. 1 is a schematic flowchart of a method according to an embodiment of the present disclosure.

As shown in FIG. 1, an evaluation method for a facial key point positioning result is provided according to an embodiment of the present disclosure, which includes steps 101 to 103.

In step 101, a facial image and a positioning result coordinate of a key point of the facial image are acquired.

In this embodiment of the present disclosure, any key point algorithm used for acquiring the positioning result coordinate of the key point of the facial image may be selected. Different positioning result coordinates may be acquired by different algorithms, which may be evaluated in this embodiment. In this embodiment, multiple groups of different positioning result coordinates may be acquired based on randomness of an Explicit Shape Regressor (ESR) positioning algorithm for facial features.

In step 102, a normalization process is performed on the positioning result coordinate and an average facial model to obtain a normalized facial image.

The embodiment of the present disclosure also provides a specific implementation for the normalization process, where the step that a normalization process is performed on the positioning result coordinate and an average facial model further includes:

reducing the positioning result coordinate to the average facial model to obtain a facial image region; performing a triangulation on the obtained facial image region; and performing a reflection transformation on obtained triangles as partial portions one by one to obtain the normalized facial image.

In step 103, a facial feature value of the normalized facial image is extracted and an evaluation result is calculated based on the facial feature value and a weight vector.

In an implementation, the specific implementation of calculating the evaluation result based on the facial feature value and the weight vector may include: calculating an inner product of the facial feature value and the weight vector to obtain the evaluation result. The evaluation result may be better quantified by calculating the inner product. The above embodiment, as a preferred embodiment, should not be construed as a limitation of the protection of the present disclosure.

In this embodiment of the present disclosure, after a positioning result coordinate is acquired, a normalization process is implemented by means of an average facial model, and an evaluation result is then calculated based on a facial feature value of a normalized facial image and a weight vector. The whole evaluation process does not need manual intervention, the evaluation speed is high, and parameters used for the calculation of the evaluation result can be quantified, so the evaluation result can be quantified.

In addition, in this embodiment of the present disclosure, the positioning result of the facial feature points can be automatically evaluated, and the whole evaluation process does not need manual intervention. To some extent, the embodiment of the present disclosure fills the gap of the automatically evaluating technique for the facial key point positioning result. In this disclosure, a quantitative evaluation of the positioning result of the facial feature points may be given, the evaluation speed (about 10 milliseconds per automatic evaluation) and the reliability are high.

In the embodiment of the present disclosure, the facial feature value is a parameter for describing the facial feature, also referred as a feature descriptor. According to different requirements and focuses, the facial feature value may be selected accordingly. In order to improve the stability, a combination of the facial feature values may be used. The facial feature value includes at least one of a Histogram of Oriented Gradient (HOG) feature value, a Local Binary Patterns (LBP) feature value, and a Gabor (windowed fourier transformation) feature value.

The embodiment of the present disclosure may be used for selecting one or more results with higher accuracy from multiple positioning results of facial features positioning algorithm. Therefore the accuracy of the facial key point positioning result is improved, and the positioning result including a serious error is effectively avoided. The positioning result coordinates include at least two groups of positioning result coordinates, after the evaluation result is obtained, the method further includes:

recombining a preset number of the acquired positioning result coordinates with the highest evaluation accuracy to obtain a target positioning result coordinate.

In the embodiment of the present disclosure, an implementation for acquiring an average facial model is provided. It should be noted that the calculation of the average facial model may not be performed on the evaluation device side for the facial key point positioning result. The average facial model may be obtained by other devices, and sent to the evaluation device side for the facial key point positioning result. The average facial model may be obtained as follows. Before the performing the normalization process on the positioning result coordinate and the average facial model, the method further includes:

acquiring M facial images and key point coordinates marked manually, where M>1; and calculating the average facial model based on the key point coordinates marked manually by using a least squares method.

In the embodiment of the present disclosure, an implementation for acquiring the weight vector is provided. It should be noted that the calculation of the weight vector may not be performed on the evaluation device side for the facial key point positioning result. The weight vector may be obtained by other devices, and sent to the evaluation device side for the facial key point positioning result. The weight vector may be obtained as follows. Before the calculating the evaluation result based on the facial feature value and the weight vector, the method further includes:

performing a positioning calculation on the M facial images by using an Explicit Shape Regressor (ESR) algorithm to obtain K key point coordinates, where K>1;

calculating a Root of Mean Squared Error (RMSE) between the K key point coordinates and the key point coordinates marked manually;

determining an accuracy score of the K key point coordinates based on the calculated RMSE, where the greater the RMSE, the less the accuracy score;

reducing the K key point coordinates to the average facial model to obtain a reference facial image, and extracting a facial feature value of the reference facial image; and calculating the weight vector by using the facial feature value and the accuracy score.

It should be noted that the above expression of "the greater the RMSE, the less the accuracy score" only represents a trend, which may be that a great RMSE represents a small accuracy score strictly, or be that the relationship between the RMSE and the accuracy score is in a truncated manner. For example, the accuracy score is 0 in a case that the RMSE is greater than a certain value, or a great RMSE represents a small accuracy score in a case that the RMSE is less than the certain value.

In this embodiment, a more specific implementation for calculating the weight vector by using the above facial feature value and the accuracy score. The specific implementation may be executed multiple times to acquire a better effect in the present embodiment. The specific implementation is described as follows. The calculating the weight vector by using the facial feature value and the accuracy score includes:

calculating an inner product of the facial feature value and a current weight vector as an evaluation score, and sorting evaluation scores; and calculating a weight deviation between a sorting result and the accuracy score, and updating the current weight vector based on the deviation to obtain the weight vector.

In the embodiment of the present disclosure, an evaluation method for a facial key point positioning result without reference is provided. Multiple facial key point positioning results may be sorted automatically without human intervention. With this sort, one or more accurate results may be selected from multiple results, so as to improve the overall accuracy of facial feature point positioning and to avoid the result including a serious error. The embodiments of the present disclosure are also based on the idea of comparison and sorting of a sequence, multiple pieces of key point positioning data of the same face are considered, and the evaluation scores can be given by using a Histogram of Oriented Gradient (HOG) feature of a normalized facial image and a trained weight result. The N results are sorted based on the evaluation scores, it is obtained a positioning result by combining the results, which is better than a positioning result obtained by selecting the median of the results. According to the innovation point in this embodiment of the present disclosure, a ListNet (sequence network, configured to train serialization data) sorting algorithm framework and the HOG feature of the facial image are utilized to evaluate the facial key point positioning result. In this embodiment of the present disclosure, the evaluation of the positioning result may be completed automatically, the accuracy of facial key point positioning result is improved, and the positioning result including a serious error is avoided.

In the following embodiment, an example that the facial feature value is an HOG feature value (also referred as HOG data characteristics) is taken. In the embodiment of the present disclosure, the following HOG characteristic principle is used. The central idea of HOG is that a detected outline of a part of an object may be described by an intensity gradient or a distribution of an edge direction. By dividing the entire image into small connecting regions (also referred as cells), a Histogram of Oriented Gradient is generated for each cell or an edge direction of the pixel in the cell is generated for each cell. The combination of these histograms represents (the target of the detected target) the descriptor. To improve the accuracy, the local histogram may be normalized by a measure which is an intensity of a larger region (referred as a block) in the image. Then all the cells in the block are normalized by using this value (measure). This normalization process achieves a better illumination/shadow invariance.

Compared with other descriptors, the descriptor acquired by the HOG keeps a geometric and optical transformation invariance (unless the object direction changes). Therefore, the HOG descriptor is particularly suitable for human detection.

General Speaking:

a feature extraction method by the HOG is to perform following process on an image.

1. A graying is performed on the image (regarding the image as an x, y, z (gray) of three-dimensional image).

2. The image is divided into small cells (2*2).

3. The gradient (i.e. orientation) of each pixel in each cell is calculated.

4. A histogram of gradient (the number of different gradients) of each cell is obtained, so as to form a descriptor for each cell.

The following example mainly includes three aspects.

Figure 2:
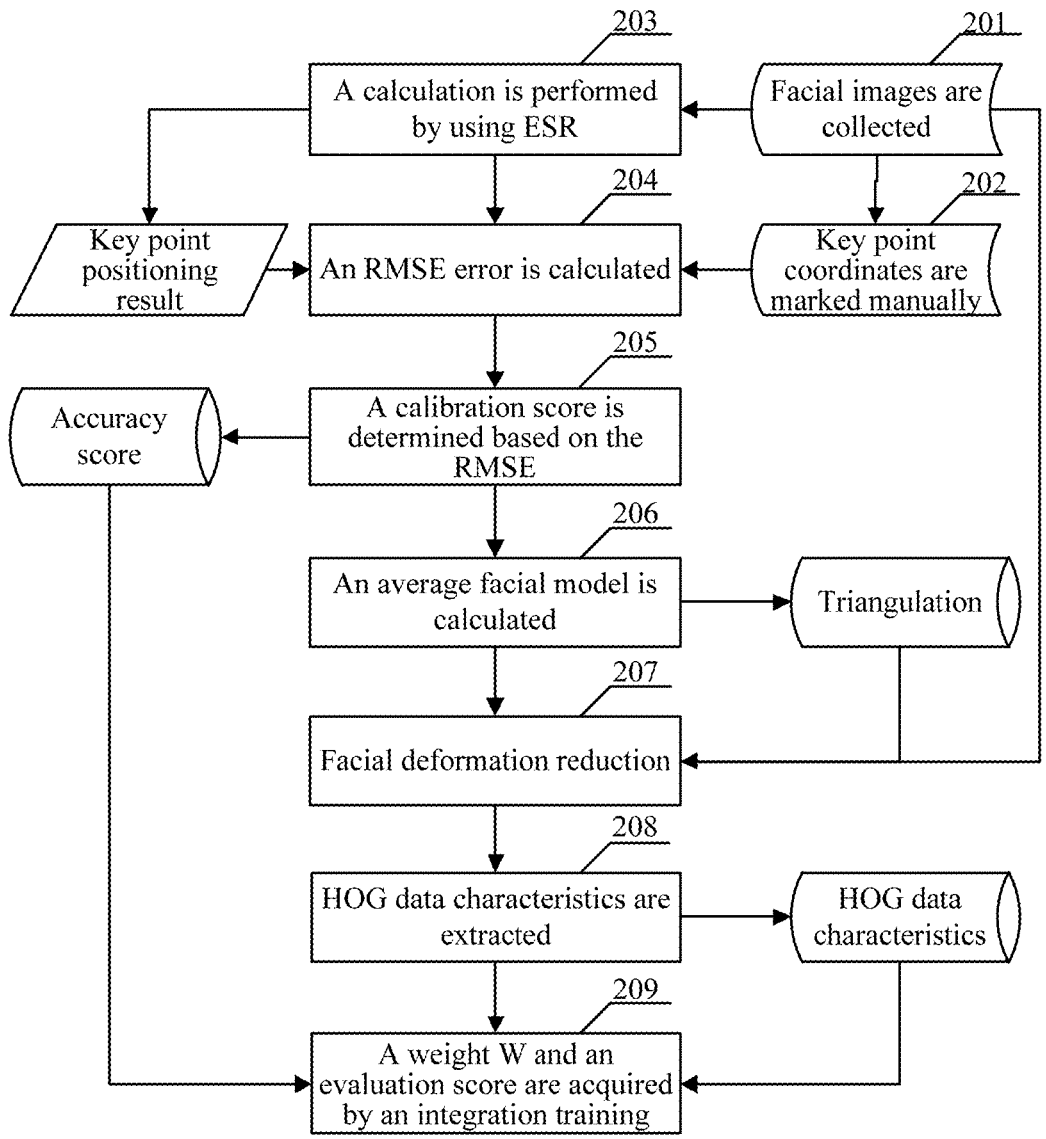
FIG. 2 is a schematic flowchart of a method according to an embodiment of the present disclosure.

(1) As shown in FIG. 2, a training data preparation process includes steps 201 to 209.

In step 201, M different facial images are collected.

In step 202, N facial key point coordinates are marked manually for each face, which is recorded as: $P_i^T$, i=(1, 2, ..., N).

In step 203, by using the randomness of the facial key point positioning algorithm of Explicit Shape Regressor (ESR), K key point positioning results of each face (the positioning result coordinates of the key points) are calculated, which are recorded as: $P_i^k$, i=(1, 2, ..., N), k=(1, 2, ..., K).

In step 204, a Root of Mean Squared Error (RMSE) is calculated as follows.

The Root of Mean Squared Error (RMSE) corresponding to the key point positioning result acquired in step 203 is calculated based on the key point coordinates marked manually.

In step 205, a calibration score is determined based on the RMSE to obtain an accuracy score. The calibration method is described as follows.

A great RMSE represents a small calibration score, while a small RMSE represents a great calibration score.

The procedure for calibrating the accuracy score is described as follows.

The RMSE is treated in a truncated manner, the value in a range of 0.0 to 10.0 remains the same, and the value greater than 10.0 is recorded as 10.0. The RMSE value (0.0 to 10.0) is mapped to the accuracy score (100 to 0). For example, if RMSE=0.0, accuracy score is 100; if RMSE=2.0, accuracy score is 80, if RMSE=10.0, accuracy score is 0. Other scores may be acquired similarly.

In step 206, an average facial model is calculated based on the manually marked facial key point coordinates of the M facial images by using a least squares method, and a triangulation is performed on the average facial model.

In step 207, a facial deformation reduction is performed as follows.

For each facial image, K key point positioning results are outputted according to the ESR algorithm, and are reduced to the same average face. In this way, different facial images are obtained.

In step 208, HOG data characteristics are extracted on the facial image obtained by reduction.

In step 209, a weight W and an evaluation score are acquired by an integration training.

The weight W is obtained by inputting the HOG data characteristics and the accuracy score into a training framework of the ListNet to perform a training. The inner product of the weight W and the HOG data characteristics is calculated to acquire the evaluation score of the facial key points.

Figure 3:
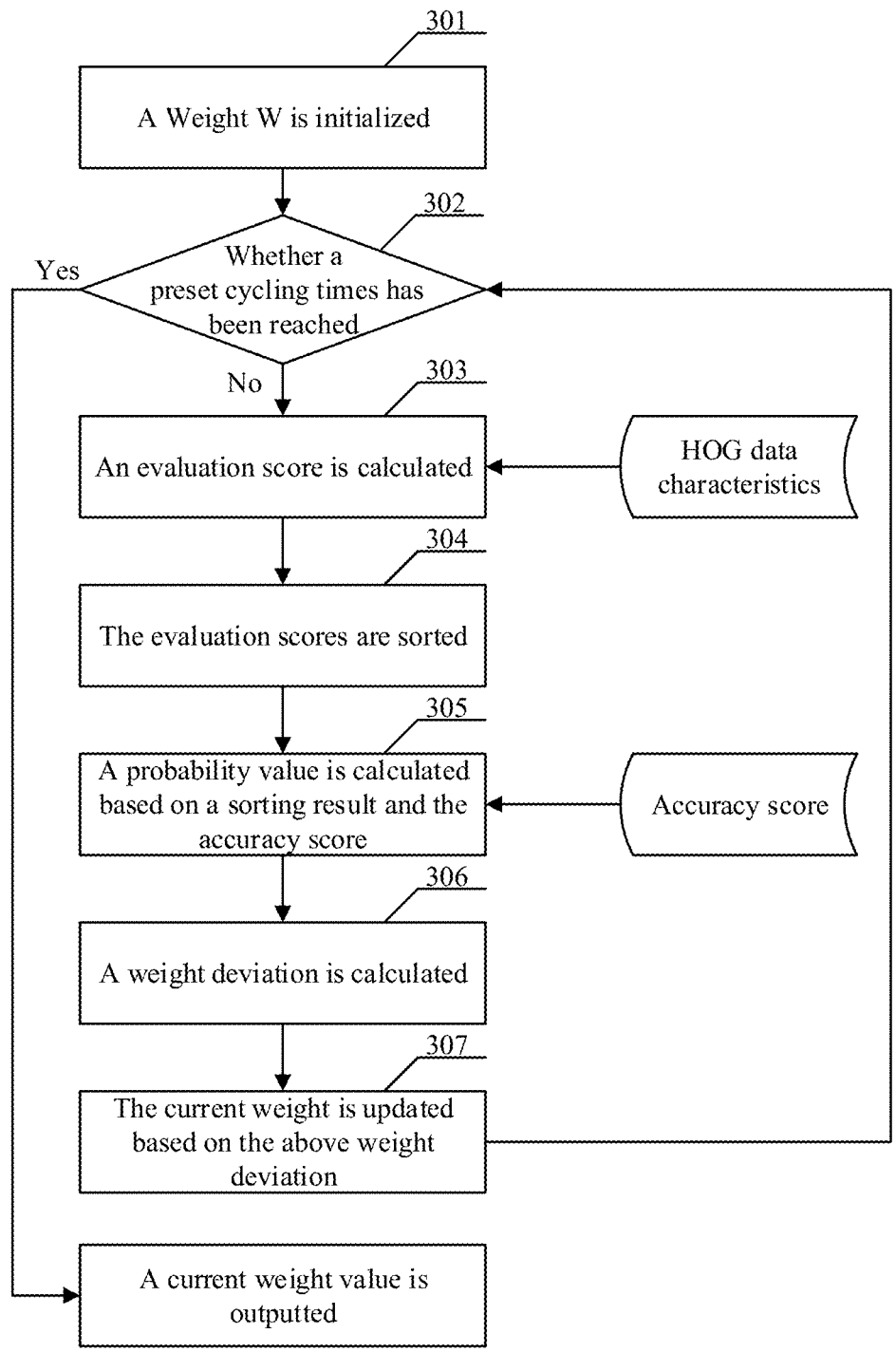
FIG. 3 is a schematic flowchart of a method according to an embodiment of the present disclosure.

(2) As shown in FIG. 3, ListNet training process includes steps 301 to 307.

In step 301, a Weight W is initialized.

In step 302, it is determined whether a preset cycling times has been reached. A current weight value is outputted in a case that the preset cycling times has been reached; and step 303 is performed in a case that the preset cycling times has not been reached.

In step 303, an evaluation score is calculated based on the current weight and the HOG data characteristics.

In this step, an inner product of the HOG data characteristics and the current weight are calculated as an evaluation score.

In step 304, the evaluation scores are sorted.

In step 305, a probability value is calculated based on a sorting result and the accuracy score.

The accuracy score is an RMSE calculated by the evaluation score corresponding to the manually marked key point coordinates.

In this step, a cross entropy is used for measuring the probability value of a current sequence.

In step 306, a weight deviation is calculated. A gradient descent method is used for calculating the weight deviation in this step.

In step 307, the current weight is updated based on the above weight deviation.

Figure 4:
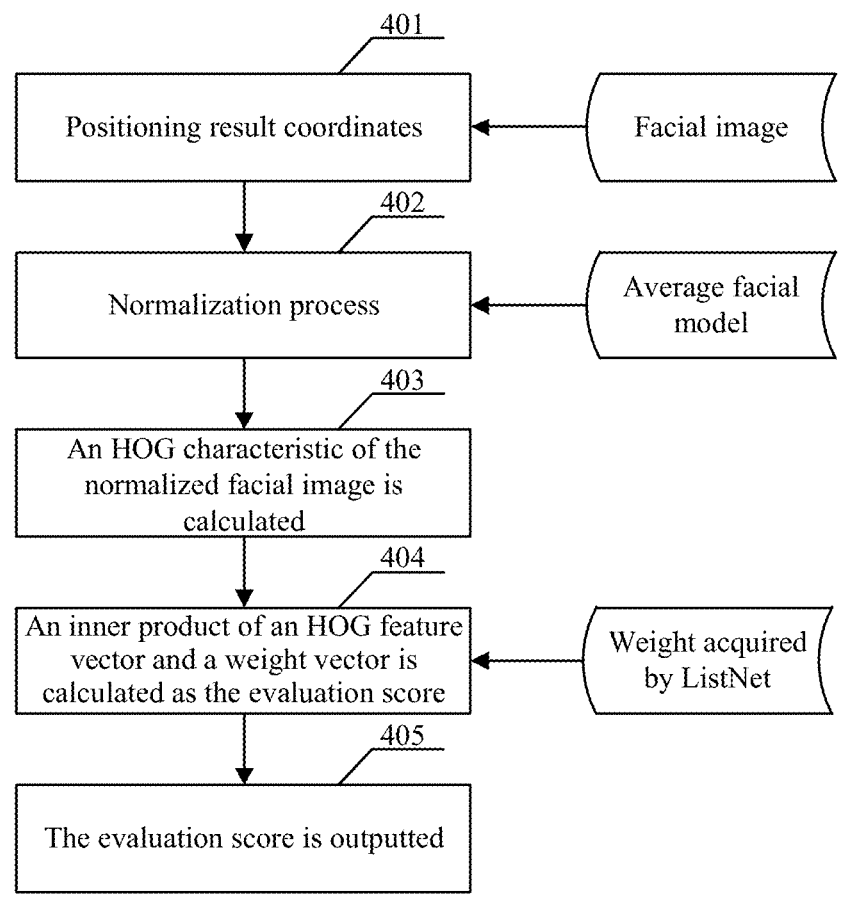
FIG. 4 is a schematic flowchart of a method according to an embodiment of the present disclosure.

(3) As shown in FIG. 4, in the model evaluation stage, the evaluation process of the facial key point includes steps 401 to 405.

In step 401, a facial image is inputted, the key points of the facial features is positioned automatically by using the facial key point positioning algorithm, so as to acquire the positioning result coordinates.

In step 402, a normalized process is performed based on the positioning result coordinates and the average facial model (referring to step 206 in the foregoing embodiment for the acquisition process of average face model).

The normalization solution is described as follows.

The triangulation is performed on the face region based on the positioning points. Each triangle is a partial part. A reflection transformation (Piece-wise Affine Transform) is performed on each triangle to obtain the normalized facial image.

In step 403, an HOG characteristics of the normalized facial image is calculated.

In step 404, an inner product of an HOG feature vector and a weight vector is calculated as the evaluation score.

The acquisition of the weight vector in this step refers to the acquisition of the weight in the ListNet training process in the foregoing embodiment.

In step 405, the evaluation score is outputted.

In the embodiment of the present disclosure, after multiple face key point positioning results are acquired, for example, by using multiple facial key point positioning algorithms, or by using the randomness of the face key positioning algorithm such as ESR to output multiple positioning results on the same facial image, the accuracy of each positioning result is automatically evaluated by the evaluation algorithm of the present disclosure. The results are sorted based on the evaluation scores of the accuracy. Further, a more stable and accurate facial key point positioning result may be obtained by selecting the positioning result with the highest accuracy, or selecting several positioning results with the highest accuracy for recombination.

In the embodiment of the present disclosure, the accuracy of the facial key point positioning result may be evaluated automatically, which can effectively improve the accuracy of the facial key point positioning and avoid a case that the key point positioning is obvious deviated. The accurate facial key point positioning results can be directly used in applications such as facial makeup beautifying, facial makeup changing, which may significantly reduce manual interaction and improve the user experience. The specific application after the evaluation of the facial key point positioning results may be determined by actual requirements, which is not limited by the embodiments of the present disclosure.

Figure 5:
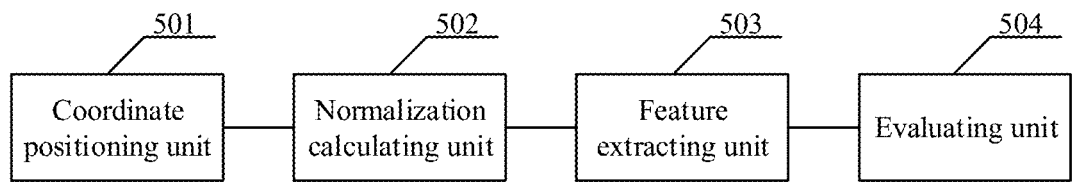
FIG. 5 is a schematic structural diagram of an evaluation device according to an embodiment of the present disclosure.

In an embodiment of the present disclosure, an evaluation device for a facial key point positioning result is provided. As shown in FIG. 5, the evaluation device for a facial key point positioning result includes a coordinate positioning unit 501, a normalization calculating unit 502, a feature extracting unit 503 and an evaluating unit 504.

The coordinate positioning unit 501 is configured to acquire a facial image and one or more positioning result coordinates of a key point of the facial image.

The normalization calculating unit 502 is configured to perform a normalization process on the positioning result coordinate and an average facial model to obtain a normalized facial image.

The feature extracting unit 503 is configured to extract a facial feature value of the normalized facial image.

The evaluating unit 504 is configured to calculate an evaluation result based on the facial feature value and a weight vector.

In this embodiment of the present disclosure, any key point algorithm may be selected. Different positioning result coordinates may be acquired by different algorithms, which may be evaluated in this embodiment. In this embodiment, multiple groups of different positioning result coordinates may be acquired based on randomness of an Explicit Shape Regressor (ESR) positioning algorithm for facial features.

In this embodiment of the present disclosure, after a positioning result coordinate is acquired, a normalization process is implemented by means of an average facial model, and an evaluation result is then calculated based on a facial feature value of a normalized facial image and a weight vector. The whole evaluation process does not need manual intervention, the evaluation speed is high, and parameters used for the calculation of the evaluation result can be quantified, so the evaluation result can be quantified.

In addition, in this embodiment of the present disclosure, the positioning result of the facial feature points can be automatically evaluated, and the whole evaluation process does not need manual intervention. To some extent, the embodiment of the present disclosure fills the gap of the automatically evaluating technique for the facial key point positioning result. In this disclosure, a quantitative evaluation of the positioning result of the facial feature points may be given, the evaluation speed (about 10 milliseconds per automatic evaluation) and the reliability are high.

In the embodiment of the present disclosure, the facial feature value is a parameter for describing the facial feature, also referred as a feature descriptor. According to different requirements and focuses, the facial feature value may be selected accordingly. In order to improve the stability, a combination of the facial feature values may be used.

The facial feature value includes at least one of a Histogram of Oriented Gradient (HOG) feature value, a Local Binary Patterns (LBP) feature value, and a windowed fourier transformation Gabor feature value.

The embodiment of the present disclosure also provides a specific implementation for the normalization process, the normalization calculating unit 502 is configured to: reduce the positioning result coordinate to the average facial model to obtain a facial image region; perform a triangulation on the obtained facial image region; and perform a reflection transformation on obtained triangles as partial portions one by one to obtain the normalized facial image.

Figure 6:
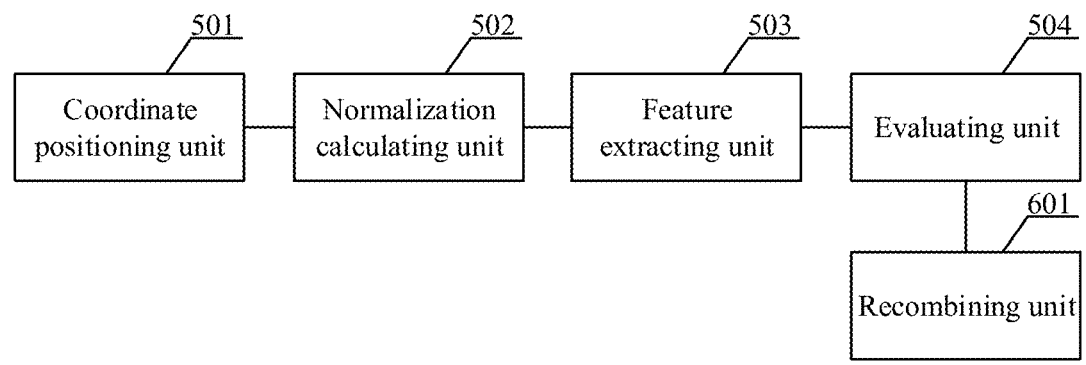
FIG. 6 is a schematic structural diagram of an evaluation device according to an embodiment of the present disclosure.

The embodiment of the present disclosure may be used for selecting one or more results with higher accuracy from multiple positioning results of facial features positioning algorithm. Therefore the accuracy of the facial key point positioning result is improved, and the positioning result including a serious error is effectively avoided. Furthermore, as shown in FIG. 6, the positioning result coordinates include at least two groups of positioning result coordinates, and the evaluation device further includes a recombining unit 601.

The recombining unit 601 is configured to, after the evaluating unit 504 obtains the evaluation result, recombine a preset number of the acquired positioning result coordinates with the highest evaluation accuracy to obtain a target positioning result coordinate.

Figure 7:
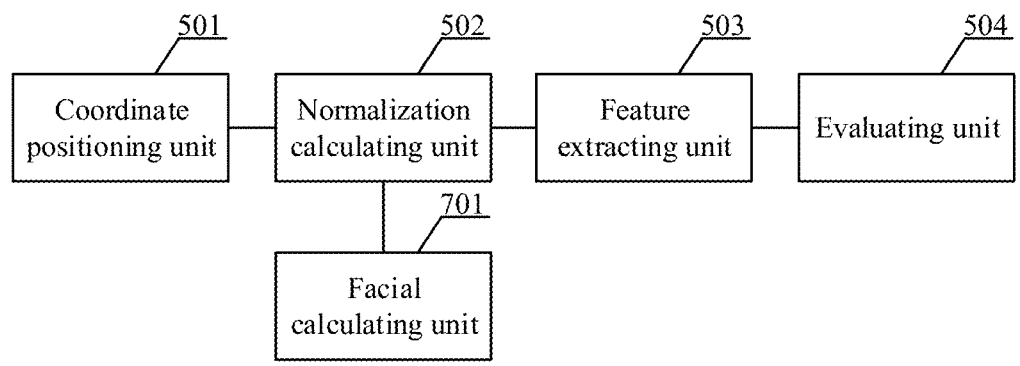
FIG. 7 is a schematic structural diagram of an evaluation device according to an embodiment of the present disclosure.

In the embodiment of the present disclosure, an implementation for acquiring an average facial model is provided. It should be noted that the calculation of the average facial model may not be performed on the evaluation device side for the facial key point positioning result. The average facial model may be obtained by other devices, and sent to the evaluation device side for the facial key point positioning result. The average facial model may be obtained as follows. Furthermore, as shown in FIG. 7, the evaluation device further includes a facial calculating unit 701.

The facial calculating unit 701 is configured to, before the normalization calculating unit 502 performs the normalization process on the positioning result coordinate and the average facial model: acquire M facial images and key point coordinates marked manually, where M>1; and calculate the average facial model based on the key point coordinates marked manually by using a least squares method.

Figure 8:
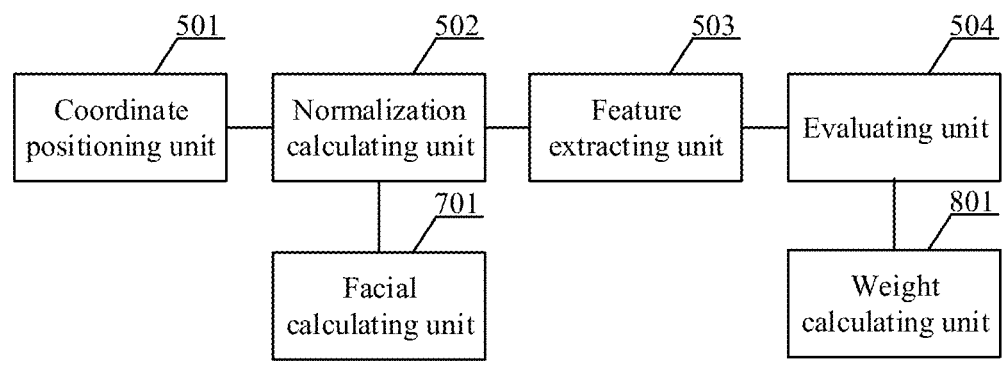
FIG. 8 is a schematic structural diagram of an evaluation device according to an embodiment of the present disclosure.

In the embodiment of the present disclosure, an implementation for acquiring the weight vector is provided. It should be noted that the calculation of the weight vector may not be performed on the evaluation device side for the facial key point positioning result. The weight vector may be obtained by other devices, and sent to the evaluation device side for the facial key point positioning result. The weight vector may be obtained as follows. Furthermore, as shown in FIG. 8, the evaluation device further includes a weight calculating unit 801.

The weight calculating unit 801 is configured to, before the evaluating unit 504 calculates the evaluation result based on the facial feature value and the weight vector: perform a positioning calculation on the M facial images by using an Explicit Shape Regressor (ESR) algorithm to obtain K key point coordinates, where K>1; calculate a Root of Mean Squared Error (RMSE) between the K key point coordinates and the key point coordinates marked manually; determine an accuracy score of the K key point coordinates based on the calculated RMSE, where the greater the RMSE, the less the accuracy score; reduce the K key point coordinates to the average facial model to obtain a reference facial image, and extract a facial feature value of the reference facial image; and calculate the weight vector by using the facial feature value and the accuracy score.

It should be noted that the above expression of "the greater the RMSE, the less the accuracy score" only represents a trend, which may be that a great RMSE represents a small accuracy score strictly, or be that the relationship between the RMSE and the accuracy score is in a truncated manner. For example, the accuracy score is 0 in a case that the RMSE is greater than a certain value, or a great RMSE represents a small accuracy score in a case that the RMSE is less than the certain value.

In this embodiment, a more specific implementation for calculating the weight vector by using the above facial feature value and the accuracy score. The specific implementation may be executed multiple times to acquire a better effect in the present embodiment. Optionally, in a step of calculating the weight vector by using the facial feature value and the accuracy score, the weight calculating unit 801 is further configured to: calculate an inner product of the facial feature value and a current weight vector as an evaluation score, and sort evaluation scores; and calculate a weight deviation between a sorting result and the accuracy score, and update the current weight vector based on the deviation to obtain the weight vector.

Figure 9:
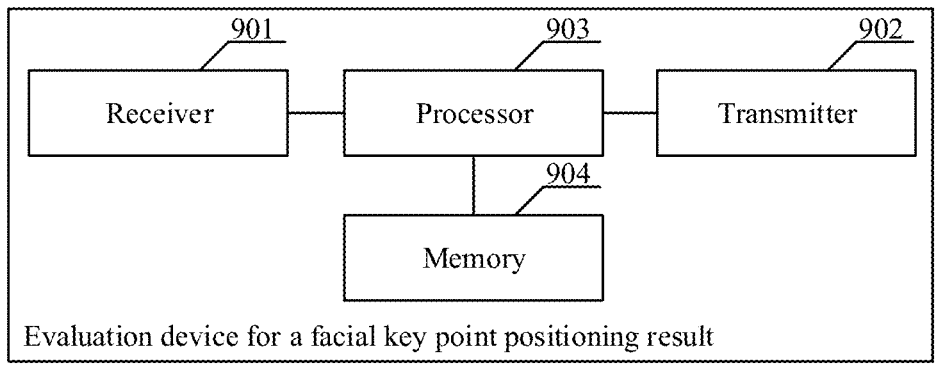
FIG. 9 is a schematic structural diagram of an evaluation device according to an embodiment of the present disclosure.

In an embodiment of the present disclosure, another evaluation device for a facial key point positioning result is provided. As shown in FIG. 9, the evaluation device includes a memory 904 and a processor 903.

The memory 904 is configured to store a program.

The processor 903 is configured to execute the program stored in the memory 904. When executing the program stored in the memory 904, the processor 903 is configured to: acquire a facial image and a positioning result coordinate of a key point of the facial image; perform a normalization process on the positioning result coordinate and an average facial model to obtain a normalized facial image; and extract a facial feature value of the normalized facial image and calculate an evaluation result based on the facial feature value and a weight vector.

In addition, the evaluation device may further include a receiver 901 and a transmitter 902, which are configured to receive and transmit data.

In this embodiment of the present disclosure, any key point algorithm may be selected. Different positioning result coordinates may be acquired by different algorithms, which may be evaluated in this embodiment. In this embodiment, multiple groups of different positioning result coordinates may be acquired based on randomness of an Explicit Shape Regressor (ESR) positioning algorithm for facial features.

In this embodiment of the present disclosure, after a positioning result coordinate is acquired, a normalization process is implemented by means of an average facial model, and an evaluation result is then calculated based on a facial feature value of a normalized facial image and a weight vector. The whole evaluation process does not need manual intervention, the evaluation speed is high, and parameters used for the calculation of the evaluation result can be quantified, so the evaluation result can be quantified.

In addition, in this embodiment of the present disclosure, the positioning result of the facial feature points can be automatically evaluated, and the whole evaluation process does not need manual intervention. To some extent, the embodiment of the present disclosure fills the gap of the automatically evaluating technique for the facial key point positioning result. In this disclosure, a quantitative evaluation of the positioning result of the facial feature points may be given, the evaluation speed (about 10 milliseconds per automatic evaluation) and the reliability are high.

In the embodiment of the present disclosure, the facial feature value is a parameter for describing the facial feature, also referred as a feature descriptor. According to different requirements and focuses, the facial feature value may be selected accordingly. In order to improve the stability, a combination of the facial feature values may be used. The facial feature value includes at least one of a Histogram of Oriented Gradient (HOG) feature value, a Local Binary Patterns (LBP) feature value, and a Gabor (windowed fourier transformation) feature value.

The embodiment of the present disclosure may be used for selecting one or more results with higher accuracy from multiple positioning results of facial features positioning algorithm. Therefore the accuracy of the facial key point positioning result is improved, and the positioning result including a serious error is effectively avoided. The positioning result coordinates include at least two groups of positioning result coordinates. When executing the program stored in the memory 904, the processor 903 is configured to, after the evaluation result is obtained, recombine a preset number of the acquired positioning result coordinates with the highest evaluation accuracy to obtain a target positioning result coordinate.

The embodiment of the present disclosure also provides a preferred implementation for the normalization process, where the step that the processor 903 performs a normalization process on the positioning result coordinate and an average facial model includes: reducing the positioning result coordinate to the average facial model to obtain a facial image region; performing a triangulation on the obtained facial image region; and performing a reflection transformation on obtained triangles as partial portions one by one to obtain the normalized facial image. This embodiment should not be construed as a limitation of the protection of the present disclosure.

In the embodiment of the present disclosure, an implementation for acquiring an average facial model is provided. It should be noted that the calculation of the average facial model may not be performed on the evaluation device side for the facial key point positioning result. The average facial model may be obtained by other devices, and sent to the evaluation device side for the facial key point positioning result. The average facial model may be obtained as follows. When executing the program stored in the memory 904, the processor 903 is configured to, before performing the normalization process on the positioning result coordinate and the average facial model: acquire M facial images and key point coordinates marked manually, where M>1; and calculate the average facial model based on the key point coordinates marked manually by using a least squares method.

In the embodiment of the present disclosure, an implementation for acquiring the weight vector is provided. It should be noted that the calculation of the weight vector may not be performed on the evaluation device side for the facial key point positioning result. The weight vector may be obtained by other devices, and sent to the evaluation device side for the facial key point positioning result. The weight vector may be obtained as follows. When executing the program stored in the memory 904, the processor 903 is configured to, before calculating the evaluation result based on the facial feature value and the weight vector: perform a positioning calculation on the M facial images by using an Explicit Shape Regressor (ESR) algorithm to obtain K key point coordinates, where K>1;

calculate a Root of Mean Squared Error (RMSE) between the K key point coordinates and the key point coordinates marked manually;

determine an accuracy score of the K key point coordinates based on the calculated RMSE, where the greater the RMSE, the less the accuracy score;

reduce the K key point coordinates to the average facial model to obtain a reference facial image, and extract a facial feature value of the reference facial image; and calculate the weight vector by using the facial feature value and the accuracy score.

It should be noted that the above expression of "the greater the RMSE, the less the accuracy score" only represents a trend, which may be that a great RMSE represents a small accuracy score strictly, or be that the relationship between the RMSE and the accuracy score is in a truncated manner. For example, the accuracy score is 0 in a case that the RMSE is greater than a certain value, or a great RMSE represents a small accuracy score in a case that the RMSE is less than the certain value.

In this embodiment, a more specific implementation for calculating the weight vector by using the above facial feature value and the accuracy score. The specific implementation may be executed multiple times to acquire a better effect in the present embodiment. The specific implementation is described as follows. The step that the processor 903 calculates the weight vector by using the facial feature value and the accuracy score includes: calculating an inner product of the facial feature value and a current weight vector as an evaluation score, and sorting evaluation scores; and calculating a weight deviation between a sorting result and the accuracy score, and updating the current weight vector based on the deviation to obtain the weight vector.

Figure 10:
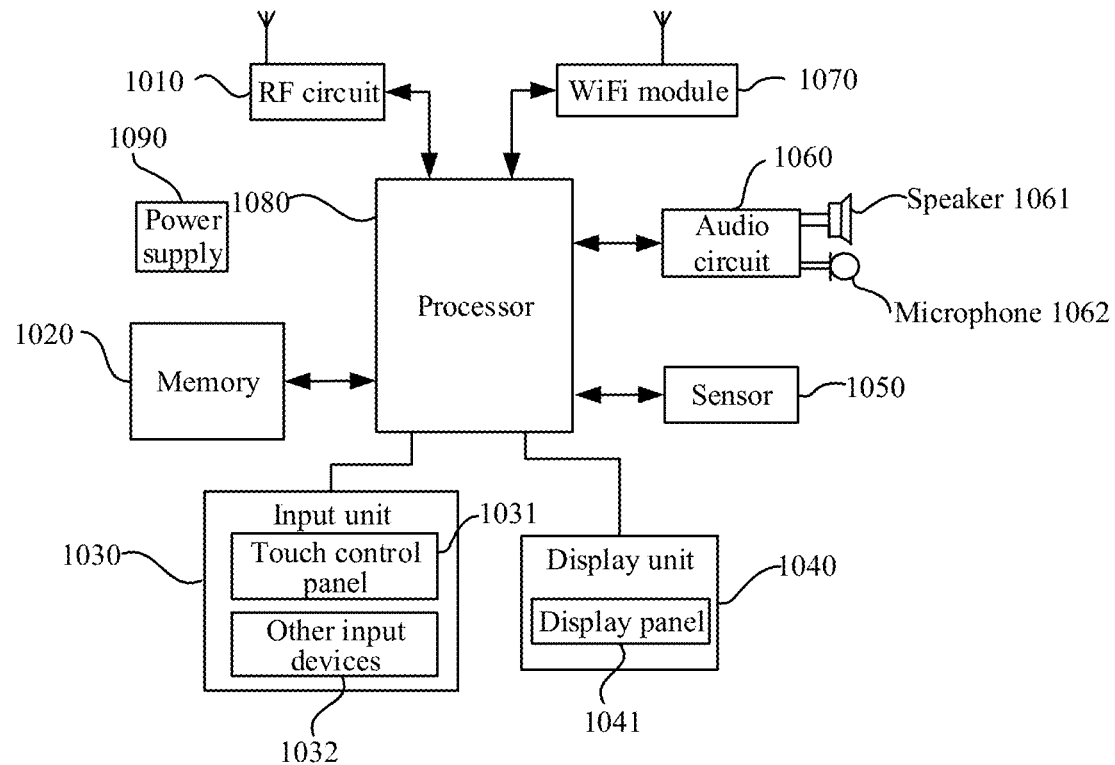
FIG. 10 is a schematic structural diagram of an evaluation device according to an embodiment of the present disclosure.

Reference is made to FIG. 10, which shows another evaluation device for facial key point positioning result according to an embodiment of the present disclosure. For the convenience of illustration, only portions related to the embodiments of the present disclosure are shown. Specific technical details which are not disclosed should refer to the portion of the method embodiment of the present disclosure. A terminal may be any one of a mobile phone, a tablet computer, a Personal Digital Assistant (PDA), a Point of Sales (POS), an on-board computer. An example that the terminal is a mobile phone is taken for illustration.

FIG. 10 is a structural block diagram of parts of a mobile phone related to a terminal according to the embodiment of the present disclosure. As shown in FIG. 10, the mobile phone includes a Radio Frequency (RF) circuit 1010, a memory 1020, an input unit 1030, a display unit 1040, a sensor 1050, an audio circuit 1060, a wireless fidelity (WiFi) module 1070, a processor 1080 and a power supply 1090, etc. It will be understood by those skilled in the art that the mobile phone is not limited to the structure shown in FIG. 10. The mobile phone may include more components, or fewer components, or some combination of the components, or a different arrangement of the components.

Hereinafter, the constituent parts of the mobile phone will be described with detail in conjunction with FIG. 10.

The RF circuit 1010 may be configured to, in process of receiving and sending information or making a call, receive and transmit signals, and in particular to transmit downlink information to the processor 1080 after the downlink information is received from a base station, and transmit data related to uplink to the base station. Generally, the RF circuit 1010 includes, but is not limited to, an antenna, at least one amplifier, a transceiver, a coupler, a Low Noise Amplifier (LNA), a duplexer or the like. In addition, the RF circuit 1010 may also communicate with the network and other devices through wireless communication. The wireless communication may be performed by using any communication standard or protocol including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS) or the like.

The memory 1020 may be configured to store software programs and modules, which may be executed by the processor 1080 to execute various function applications and data processing of the mobile phone. The memory 1020 may mainly include a program storage region and a data storage region. The program storage region may store an operating system, an application required by at least one function (such as a sound play function, an image play function), or the like. The data storage region may store data (such as audio data, a phone or the like) created based on the using of the mobile phone. In addition, the memory 1020 may include a high-speed random access memory, and may further include a non-volatile memory, such as at least one magnetic disk storage device, a flash memory device, or other volatile solid state memory device.

The input unit 1030 may be configured to receive inputted digital or character information, and to generate a key signal input that are related to user settings and function control of the mobile phone. Specifically, the input unit 1030 may include a touch control panel 1031 and other input devices 1032. The touch control panel 1031, also referred as a touch screen, may collect touch operations of a user on the touch control panel 1031 or near the touch control panel 1031 (such as operations of the user performed by any suitable objects or accessories such as a finger, a stylus on or near the touch control panel 1031), and drive a corresponding connection device according to a preset program. Optionally, the touch control panel 1031 may include a touch detection device and a touch controller. The touch detection device detects a touch orientation of a user, detects signals caused by the touch operation, and transmits the signals to the touch controller. The touch controller receives the touch information from the touch detection device, converts the touch information into coordinates of the touch point, then transmits the coordinates to the processor 1080, and receives commands from the processor 1080 and executes the commands. In addition, the touch control panel 1031 can be realized by various touch-sensitive technical types, such as resistive type, capacitive type, infrared light type and surface acoustic wave type. In addition to the touch control panel 1031, the input unit 1030 may also include other input devices 1032. Specifically, other input devices 1032 may include but are not limited to one or more of a physical keyboard, a function key (such as a volume control button, a switch button, etc.), a track ball, a mouse, an operating rod or the like.

The display unit 1040 may be configured to display information inputted by a user or information provided for the user, and various menus of the mobile phone. The display unit 1040 may include a display panel 1041. Optionally, the display panel 1041 may be configured in the form of a Liquid Crystal Display (LCD), an Organic Light-Emitting Diode (OLED) or the like. Further, the touch control panel 1031 may cover the display panel 1041. After a touch operation on or near the touch control panel 1031 is detected, the touch operation is transmitted to the processor 1080 to determine the type of a touch event, and then the processor 1080 provides a corresponding visual output on the display panel 1041 based on the type of the touch event. Although the touch control panel 1031 and the display panel 1041 are two separate components to realize an input function and an output function of the mobile phone in FIG. 10, in some embodiments, the touch control panel 1031 may be integrated with the display panel 1041 to realize the input function and output function of the mobile phone.

The mobile phone may also include at least one sensor 1050, such as a light sensor, a motion sensor and other sensors. Specifically, the light sensor may include an ambient light sensor and a proximity sensor. The ambient light sensor may adjust the brightness of the display panel 1041 based on the brightness of the ambient light, and the proximity sensor may close the display panel 1041 and/or back light, when the mobile phone is moved near the ear. As a kind of motion sensor, an acceleration sensor may detect the magnitude of acceleration in all directions (typically three axis), and may detect the magnitude and direction of gravity when the acceleration sensor is at rest. The acceleration sensor may be applied to applications of identifying mobile phone gesture (such as horizontal/vertical screen switching, related games, magnetometer attitude calibration), vibration identification related functions (such as a pedometer, a tap). Other sensors such as a gyroscope, a barometer, a hygrometer, a thermometer, an infrared sensor that can be provided in the mobile phone are not described herein.

The audio circuit 1060, a speaker 1061, and a microphone 1062 may provide an audio interface between a user and the mobile phone. The audio circuit 1060 may transmit an electrical signal converted from received audio data to the speaker 1061, and the speaker 1061 converts the electrical signal into a sound signal and outputs the sound signal. On the other hand, the microphone 1062 converts the collected sound signal into the electrical signal, the audio circuit 1060 receives the electrical signal and converts the electrical signal into the audio data. The audio data is outputted to the processor 1080 to be processed, the processed audio data is transmitted to another mobile phone through the RF circuit 1010, or the audio data is outputted to the memory 1020 for further processing.

WiFi is a short-range wireless transmission technology, the mobile phone may help users send and receive an e-mail, browse a web and access to streaming media through the WiFi module 1070. The WiFi module 1070 provides users with wireless broadband Internet access. Although FIG. 10 shows the WiFi module 1070, it should be understood that the WiFi module 1070 does not belong to the essential configuration of the mobile phone and may be omitted without departing from the essence of the disclosure as needed.

The processor 1080 is a control center of the mobile phone, which connects each part of the mobile phone with various interfaces and lines. By operating or executing the software programs and/or modules stored in the memory 1020 and invoking the data stored in the memory 1020, various functions and data processing of the mobile phone are performed, thus the mobile phone is monitored. Optionally, the processor 1080 may include one or more processing units. Preferably, the processor 1080 may integrate an application processor and a modem processor, where the application processor mainly processes an operating system, a user interface, an application or the like, and the modem processor mainly processes wireless communications. It should be understood that, the above-described modem processor may not be integrated into the processor 1080.

The mobile phone further includes a power supply 1090 (such as a battery) for supplying power to the multiple components. Preferably, the power supply may be logically connected to the processor 1080 through a power supply management system, so as to achieve a charging management function, a discharging management function and a power consumption management function through the power supply management system.

Although not shown, the mobile phone may also include a camera, a Bluetooth module and the like, which are not described herein.

In the embodiment of the present disclosure, the processor 1080 included in the terminal also has a function of executing the above method.

It should be noted that in the above evaluation device embodiment, each of the units is divided according to its functional logic, but the above division is not limited as long as the corresponding function can be realized. In addition, the specific name of each of the units is merely for the purpose of distinguishing from each other, which are not intended to limit the protection scope of the disclosure.

In addition, it will be appreciated by those skilled in the art that all or a part of the steps in the method embodiments described above may be accomplished by related hardware which is instructed by programs. The programs may be stored in a computer-readable storage medium, which may be a read-only memory, a magnetic disk, an optical disk or the like.

The above describes some embodiments of the present disclosure and is not intended to limit the present disclosure. Any changes and equivalents within the technical scope of the embodiments of the present disclosure shall fall within the protection scope of the present disclosure. Therefore, the protection scope of the present disclosure should be determined by the protection scope of the claims.

The invention claimed is:

1. An evaluation method for a facial key point positioning result, comprising:
by a terminal device for performing facial image analysis, the terminal device including one or more processors and memory storing instructions executed by the processors:
acquiring one or more facial images and key point coordinates marked manually;
performing a positioning calculation on the one or more facial images using an Explicit Shape Regressor (ESR) algorithm to obtain one or more key point coordinates;
calculating a Root of Mean Squared Error (RMSE) between the one or more key point coordinates and the key point coordinates marked manually;
determining an accuracy score of the one or more key point coordinates based on the calculated RMSE, wherein the greater the RMSE, the less the accuracy score;
reducing the one or more key point coordinates to the average facial model to obtain a reference facial image, and extracting a facial feature value of the reference facial image;
calculating a weight vector based on the facial feature value and the accuracy score; and
by the terminal device or another terminal device,
evaluating a facial key point positioning result based on the weight vector.

2. The method according to claim 1, wherein after the acquiring one or more facial images and key point coordinates marked manually, the method further comprises:
calculating an average facial model based on the key point coordinates marked manually using a least squares method.

3. The method according to claim 2, wherein the evaluating a facial key point positioning result based on the weight vector comprises:
acquiring a facial image and one or more positioning result coordinates of a key point of the facial image;
performing a normalization process on the positioning result coordinate and the average facial model to obtain a normalized facial image; and
extracting the facial feature value of the normalized facial image and calculating an evaluation result based on the weight vector and the facial feature value of the normalized facial image.

4. The method according to claim 3, wherein the performing the normalization process on the positioning result coordinate and the average facial model comprises:
reducing the positioning result coordinate to the average facial model to obtain a facial image region;
performing a triangulation on the obtained facial image region; and
performing a reflection transformation on obtained triangles as partial portions one by one to obtain the normalized facial image.

5. The method according to claim 3, wherein the calculating the evaluation result based on the facial feature value and the weight vector comprises:
calculating an inner product of the facial feature value and the weight vector to obtain the evaluation result.

6. The method according to claim 3, wherein the positioning result coordinates comprise at least two groups of positioning result coordinates, after the evaluation result is obtained, the method further comprises:
recombining a preset number of the acquired positioning result coordinates with the highest evaluation accuracy to obtain a target positioning result coordinate.

7. The method according to claim 1, wherein the facial feature value comprises at least one of a Histogram of Oriented Gradient (HOG) feature value, a Local Binary Patterns (LBP) feature value, and a windowed Fourier Transformation Gabor feature value.

8. The method according to claim 1, wherein the calculating a weight vector based on the facial feature value and the accuracy score comprises:
calculating an inner product of the facial feature value and a current weight vector as an evaluation score, and sorting evaluation scores; and calculating a weight deviation between a sorting result and the accuracy score, and updating the current weight vector based on the deviation to obtain the weight vector.

9. An evaluation device for a facial key point positioning result, applied in a terminal device for performing facial image analysis, and comprising a processor and a memory for storing program instructions, wherein the processor executes the program instructions to:
- acquire one or more facial images and key point coordinates marked manually;
- perform a positioning calculation on the one or more facial images by using an Explicit Shape Regressor (ESR) algorithm to obtain one or more key point coordinates;
- calculate a Root of Mean Squared Error (RMSE) between the one or more key point coordinates and the key point coordinates marked manually;
- determine an accuracy score of the one or more key point coordinates based on the calculated RMSE, wherein the greater the RMSE, the less the accuracy score;
- reduce the one or more key point coordinates to the average facial model to obtain a reference facial image, and extracting a facial feature value of the reference facial image;
- calculate a weight vector based on the facial feature value and the accuracy score; and
- evaluate a facial key point positioning result based on the weight vector.

10. The evaluation device according to claim 9, wherein the processor executes the program instructions further to:
- calculate an average facial model based on the key point coordinates marked manually using a least squares method.

11. The evaluation device according to claim 10, wherein the processor executes the program instructions further to:
- acquire a facial image and one or more positioning result coordinates of a key point of the facial image;
- perform a normalization process on the positioning result coordinate and the average facial model to obtain a normalized facial image; and
- extract the facial feature value of the normalized facial image and calculating an evaluation result based on the weight vector and the facial feature value of the normalized facial image.

12. The evaluation device according to claim 11, wherein the processor executes the program instructions further to:
- reduce the positioning result coordinate to the average facial model to obtain a facial image region;
- perform a triangulation on the obtained facial image region; and
- perform a reflection transformation on obtained triangles as partial portions one by one to obtain the normalized facial image.

13. The evaluation device according to claim 11, wherein the processor executes the program instructions further to:
- calculate an inner product of the facial feature value and the weight vector to obtain the evaluation result.

14. The evaluation device according to claim 11, wherein the positioning result coordinates comprise at least two groups of positioning result coordinates, and the processor executes the program instructions further to:
- recombine a preset number of the acquired positioning result coordinates with the highest evaluation accuracy to obtain a target positioning result coordinate, after the evaluation result is obtained.

15. The evaluation device according to claim 9, wherein the facial feature value comprises at least one of a Histogram of Oriented Gradient (HOG) feature value, a Local Binary Patterns (LBP) feature value, and a windowed Fourier Transformation Gabor feature value.

16. The evaluation device according to claim 9, wherein the processor executes the program instructions further to:
- calculate an inner product of the facial feature value and a current weight vector as an evaluation score, and sort evaluation scores; and
- calculate a weight deviation between a sorting result and the accuracy score, and update the current weight vector based on the deviation to obtain the weight vector.

17. A non-transitory computer storage medium, applied in a terminal device for performing facial image analysis, comprising computer executable instructions, wherein the computer executable instructions are adapted to perform an evaluation method for a facial key point positioning result, wherein the evaluation method for a facial key point positioning result comprises:
- acquiring one or more facial images and key point coordinates marked manually;
- performing a positioning calculation on the one or more facial images using an Explicit Shape Regressor (ESR) algorithm to obtain one or more key point coordinates;
- calculating a Root of Mean Squared Error (RMSE) between the one or more key point coordinates and the key point coordinates marked manually;
- determining an accuracy score of the one or more key point coordinates based on the calculated RMSE, wherein the greater the RMSE, the less the accuracy score;
- reducing the one or more key point coordinates to the average facial model to obtain a reference facial image, and extracting a facial feature value of the reference facial image;
- calculating a weight vector based on the facial feature value and the accuracy score; and
- evaluating a facial key point positioning result based on the weight vector.

* * * * *